US012569385B2

(12) United States Patent
Li et al.

(10) Patent No.: US 12,569,385 B2
(45) Date of Patent: Mar. 10, 2026

(54) ELECTRIC LIFT DEVICE

(71) Applicant: INTRADIN (SHANGHAI) MACHINERY CO., LTD., Shanghai (CN)

(72) Inventors: Ping Li, Shanghai (CN); Xuetao Qiao, Shanghai (CN); Yonggang Zhou, Shanghai (CN); Songlin Chen, Shanghai (CN)

(73) Assignee: INTRADIN (SHANGHAI) MACHINERY CO., LTD., Shanghai (CN)

( * ) Notice: Subject to any disclaimer, the term of this patent is extended or adjusted under 35 U.S.C. 154(b) by 41 days.

(21) Appl. No.: 18/680,884

(22) Filed: May 31, 2024

(65) Prior Publication Data

US 2024/0315902 A1 Sep. 26, 2024

(30) Foreign Application Priority Data

Mar. 5, 2024 (CN) ......................... 202420424821.7

(51) Int. Cl.
*A61G 7/10* (2006.01)

(52) U.S. Cl.
CPC ......... *A61G 7/1019* (2013.01); *A61G 7/1046* (2013.01); *A61G 7/1059* (2013.01); *A61G 7/1092* (2013.01)

(58) Field of Classification Search
CPC .. A61G 7/1046; A61G 7/1019; A61G 7/1059; A61G 2200/34; A61G 7/1011; A61G 2200/36; A61G 7/1051; A61G 7/1092; A61G 7/1017; A61G 5/14; A61G 7/1096; A61G 2200/52; A61G 7/1015; A61G 7/1074; A61G 7/1067; A61G 7/1086; A61G 7/1094; A61G 7/1048; A61G 7/1098; A61H 3/04
USPC .... 5/86.1, 81.1 R, 83.1, 89.1, 871; 280/657; 297/344.12
See application file for complete search history.

(56) References Cited

U.S. PATENT DOCUMENTS 5,333,333 A * 8/1994 Mah .......................... A61H 3/04 280/30
6,941,595 B1 * 9/2005 Michael ............... A61G 7/1019 5/83.1
8,777,238 B1 * 7/2014 Blackwood .......... A61G 7/1046 280/47.25
9,254,233 B2 * 2/2016 Schy .................... A61G 7/1059
(Continued)

FOREIGN PATENT DOCUMENTS

CN 101868215 A * 10/2010 ........... A61G 7/1046
CN 107049638 B 5/2018
CN 113425519 A 9/2021

*Primary Examiner* — Madison Emanski
*Assistant Examiner* — Madison Matthews

(57) ABSTRACT

An electric lift device includes a support assembly, a rail, a lifting column, a seat assembly and a driving component. The rail is provided on the support assembly. The lifting column is coaxially sleeved on the rail, and is configured to ascend and descend along an axis of the rail. The seat assembly is connected to the lifting column. The driving component is provided at the support assembly, and is configured to drive the lifting column to ascend and descend relative to the rail so as to drive the seat assembly to ascend and descend. The rail is inclined at a preset angle relative to the support assembly towards a side away from the seat assembly.

14 Claims, 14 Drawing Sheets

(56) References Cited

U.S. PATENT DOCUMENTS

| | | | | |
|---|---|---|---|---|
| 9,649,236 | B1 * | 5/2017 | Wike, Jr. | A61G 5/128 |
| 2003/0011228 | A1 * | 1/2003 | Komura | A61G 7/1074 297/344.12 |
| 2018/0214329 | A1 * | 8/2018 | Mitchell | A61G 7/1046 |

* cited by examiner

ELECTRIC LIFT DEVICE

CROSS-REFERENCE TO RELATED APPLICATIONS

This application claims the benefit of priority from Chinese Patent Application No. 202420424821.7, filed on Mar. 5, 2024. The content of the aforementioned application, including any intervening amendments made thereto, is incorporated herein by reference in its entirety.

TECHNICAL FIELD

This application relates to standing aid devices, and more particularly to an electric lift device.

BACKGROUND

The lift is designed to aid elderly individuals, paralyzed patients, and others with limited mobility to move and stand during the rehabilitation process. These aids are operated by the user's strength to help the user stand and walk for rehabilitation. However, most of the existing motion aid facilities are structurally complex, and fail to effectively protect the user from falling from the seat.

SUMMARY

Based on this, the main purpose of the present disclosure is to provide an electric lift device with enhanced safety and reliability.

The technical solutions of the present disclosure will be specifically described as follows.

This application provides an electric lift device, comprising:

a support assembly;

a rail;

a lifting column;

a seat assembly; and a driving component;

wherein the rail is provided on the support assembly;

the lifting column is coaxially sleeved on the rail;

the lifting column is configured to ascend and descend along an axis of the rail;

the seat assembly is connected to the lifting column;

the driving component is provided at the support assembly;

the driving component is configured to drive the lifting column to ascend and descend relative to the rail, so as to drive the seat assembly to ascend and descend; and the rail is inclined at a preset angle relative to the support assembly towards a side of the rail away from the seat assembly.

In an embodiment, the number of the rail is one or two;

the number of the rail is the same as the number of the lifting column; and the rail is in one-to-one correspondence with the lifting column.

In an embodiment, the preset angle is 4-10°.

In an embodiment, the rail is provided with a rail head;

the lifting column is coaxially sleeved on the rail from an end of the rail where the rail head is provided; and the lifting column is configured to cover the rail head.

In an embodiment, the support assembly comprises a support plate, a first rectangular tube and a second rectangular tube;

the first rectangular tube and the second rectangular tube are provided on opposite two sides of the support plate, respectively; and the rail is arranged on the support plate.

In an embodiment, a reinforcement rib is provided between the rail and the support plate; and/or the support assembly further comprises a first wheel and a second wheel; the first wheel is rotatably provided at the first rectangular tube; and the second wheel is rotatably provided at the second rectangular tube.

In an embodiment, the support plate has a Z-shaped structure;

the support plate is provided with a notch; and the rail is arranged at the notch, and is connected to the support plate.

In an embodiment, the seat assembly comprises a connecting frame, a seat, and two armrests;

the connecting frame is fixedly connected to the lifting column, the seat is connected to the connecting frame; and the two armrests are connected to opposite two sides of the connecting frame, respectively.

In an embodiment, the two armrests are hingedly connected to the connecting frame to allow the two armrests to rotate relative to the connecting frame to be folded;

a side of the seat away from the rail is provided with a first ramp portion, and two lateral sides of the seat are each provided with a second ramp portion; and the first ramp portion and the second ramp portion are configured to extend in a direction toward a floor; and/or the seat is removably connected to the connecting frame.

In an embodiment, the electric lift device, further comprising:

a controller;

two hooks;

a storage battery; and a handle;

wherein the controller is electrically connected to the driving component, and is configured to control start and stop of the driving component;

the two hooks are provided on opposite two sides of the seat assembly, and are configured for mounting a safety belt;

the storage battery is electrically connected to the driving component, and configured to power the driving component; and the handle is fixedly provided at a top of the lifting column, and is configured to ascend and descend with the lifting column relative to the rail.

The beneficial effects of the present disclosure are described as follows.

When assisting users such as the elderly or paralyzed patients who can not stand up directly by themselves in shifting positions and standing for rehabilitation, the electric lift device performs the following operations. The lifting column is driven by the driving component to descend relative to the rail, thereby lowering the seat assembly. Once the seat assembly descends to the appropriate position (such as the lowest point), the user sits on the seat assembly. Then, the lifting column is driven by the driving component to ascend relative to the rail, thereby lifting the seat assembly. As a result, the user's center of gravity rises until the user approaches a standing posture or is able to stand independently. Subsequently, the user can lean on or push against the electric lift device to move, thus achieving the user's standing, walking, or rehabilitation training. Moreover, in the prior art, the user tends to lean forward when sitting on the seat assembly, making it easy for them to fall off the seat assembly. However, in this application, the rail is inclined at a preset angle relative to the support assembly away towards a side away from the seat assembly, and the lifting column is coaxially sleeved on the rail, so the rail and lifting column of this present disclosure have a preset angle of backward inclination. When the user sits on the seat assembly, the forward-leaning tendency of the user can be counteracted or partially counteracted. Consequently, this prevents the user from falling forward from the seat assembly, making the electric lift device of this present disclosure safer and more reliable.

BRIEF DESCRIPTION OF THE DRAWINGS

In order to more clearly illustrate the technical solutions in the embodiments of the present disclosure or the prior art, the accompanying drawings needed in the description of the embodiments or the prior art will be briefly described below. Obviously, only some embodiments of the present disclosure are presented in the accompanying drawings. Other embodiments may also be obtained by those skilled in the art according to these accompanying drawings without making the creative effort.

Figure 1:
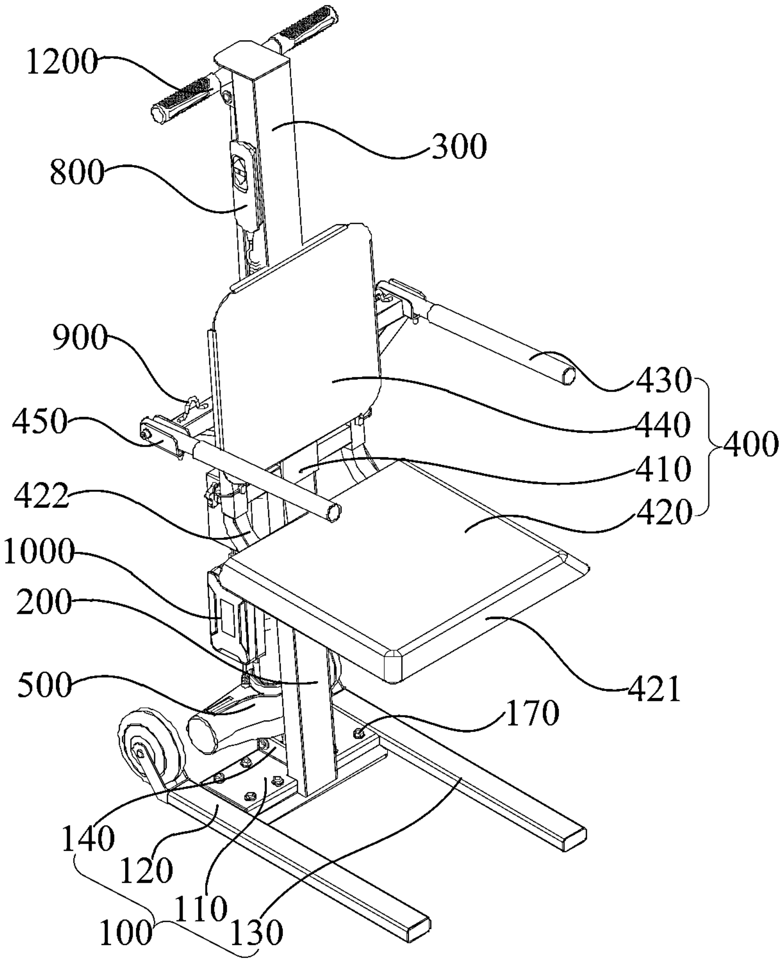
FIG. 1 is a schematic diagram of the structure of an electric lift device with a single-rail structure according to an embodiment.

In the above figures, 100—support assembly, 110—support plate, 111—notch, 120—first rectangular tube, 121—first extension part, 13—second rectangular tube, 131—second extension part, 140—reinforcement rib, 150—first wheel, 160—second wheel, 170—screw, 200—rail, 210—guide block, 220—first guide wheel, 230—first opening, 240—rail head 300—lifting column, 310—second guide wheel, 320—second opening, 330—end cap, 400—seat assembly, 410—connecting frame, 411—connecting slot, 420—seat, 421—ramp portion, 422—connecting rod, 430—armrest, 440—backrest, 450—limiting structure, 451—bottom plate, 452—side plate, 460—D-shaped pin, 500—driving component, 600—friction sleeve, 610—guide protrusion, 700—locking part, 800—controller, 900—safety hook, 910—safety belt, 1000—storage battery, 1100—charger, 1200—handle.

Further description of the implementation, function characteristics and advantages of the present disclosure will be presented referencing the embodiments and accompanying drawings.

DETAILED DESCRIPTION OF EMBODIMENTS

The clear and comprehensive description of the technical solutions in the embodiments of the present disclosure will be provided conferencing with the accompanying drawings. Obviously, the described embodiments are only part of the exemplary embodiments of the present disclosure, rather than all embodiments. Based on the embodiments of the present disclosure, all other embodiments obtained by those skilled in the art without creative labor shall fall within the scope of the disclosure defined by the appended claims.

It should be noted that all directional indications (such as top, bottom, left, right, front, rear, etc.) in the embodiments of the present disclosure are only used to explain the relative positional relationship, movement, etc., between components under a specific configuration (as shown in the drawings). If this specific configuration changes, the directional indications will change accordingly. Furthermore, descriptions involving "first," "second," etc., in the present disclosure, are only used for descriptive purposes and should not be construed as indicating or implying their relative importance or implicitly specifying the quantity of the indicated technical features. Therefore, features specified as "first" or "second" may expressly or implicitly include at least one such feature. Additionally, "and/or" herein includes three scenarios. Taking A and/or B as an example, this includes the A technical solution, the B technical solution, and the technical solution where both A and B are satisfied simultaneously. Furthermore, the technical solutions among various embodiments can be combined with each other, but it must be based on the premise that those skilled in the art can implement them. When the combination of technical solutions appears contradictory or cannot be achieved, it should be considered that this combination of technical solutions does not exist and shall not fall within the scope of protection required by the present disclosure.

The specific structure of an electric lift device will be described below.

Figure 2:
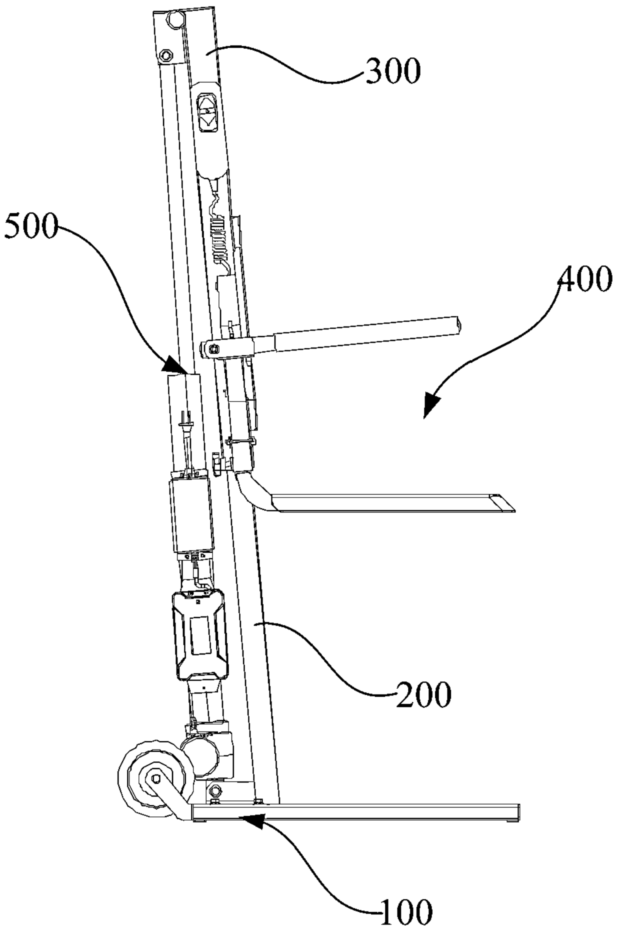
FIG. 2 is a side view of an electric lift device with a single-rail structure according to an embodiment.
Figure 3:
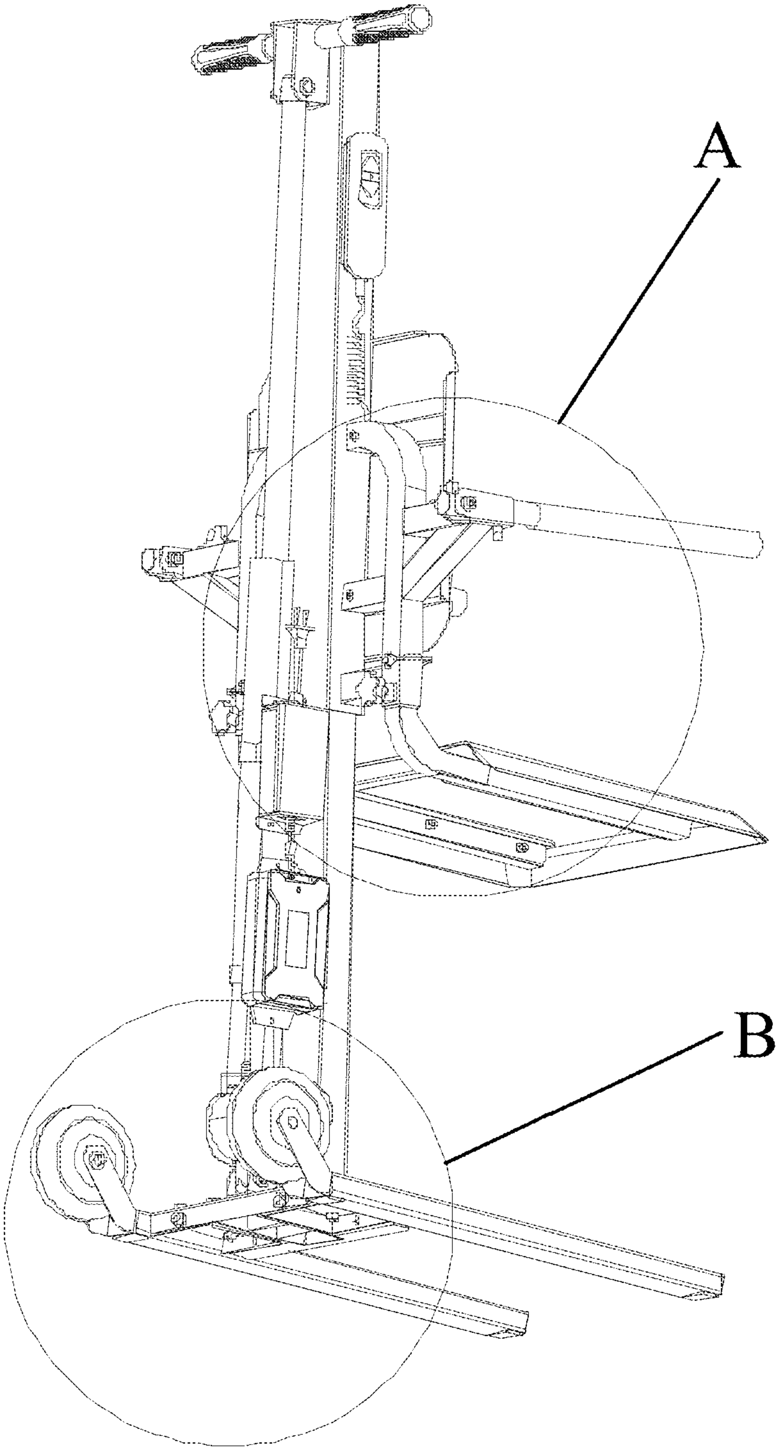
FIG. 3 is a schematic diagram of the structure of an electric lift device with a single-rail structure from another perspective according to an embodiment.

As shown in FIGS. 1-3, the electric lift device includes a support assembly 100, a rail 200, a lifting column 300, a seat assembly 400 and a driving component 500. The rail 200 is provided on the support assembly 100. The lifting column 300 is coaxially sleeved on the rail 200. The lifting column 300 is configured to ascend and descend along an axis of the rail 200. The seat assembly 400 is connected to the lifting column 300. The driving component 500 is provided at the support assembly 100, and is configured to drive the lifting column 300 to ascend and descend relative to the rail 200 so as to drive the seat assembly 400 to ascend and descend. The rail 200 is inclined at a preset angle relative to the support assembly 100 towards a side away from the seat assembly 400.

The electric lift device is operated as follows to assist users, such as the elderly or paralyzed patients who cannot stand by themselves, in shifting and standing during the rehabilitation process. The lifting column 300 is driven by the driving component 500 to descend relative to the rail 200, thereby lowering the seat assembly 400. Once the seat assembly 400 descends to the appropriate position (such as the lowest point), the user sits on the seat assembly 400. Then, the lifting column 300 is driven by the driving component 500 to ascend relative to the rail 200, thereby lifting the seat assembly 400. As a result, the user's center of gravity rises until the user approaches a standing posture or is able to stand independently. Subsequently, the user can lean on or push against the electric lift device to move, thus achieving the user's standing, walking, or rehabilitation training through the electric lift device. Moreover, in the prior art, the user tends to lean forward when sitting on the seat assembly 400, making it easy for them to fall off the seat assembly 400. However, in this application, the rail 200 is inclined at a preset angle relative to the support assembly 100 towards a side of the rail away from the seat assembly 400, and the lifting column 300 is coaxially sleeved on the rail 200, so the rail 200 and lifting column 300 of this present disclosure have a preset angle of backward inclination. When the user sits on the seat assembly 400, the forward-leaning tendency of the user can be counteracted or partially counteracted. Consequently, this prevents the user from falling forward from the seat assembly 400, making the electric lift device of this present disclosure safer and more reliable.

In the embodiment, the user refers to the occupant of the seat assembly 400.

In an embodiment, the driving component 500 is an electric push rod with a safe voltage of 24V and a thrust of 3000N. In the embodiment, the electric push rod is provided on the support assembly 100. The end of the electric push rod away from the support assembly 100 is connected to the lifting column 300, so the extension and retraction of the electric push rod can drive the lifting column 300 to ascend and descend.

In an embodiment, the number of the rail 200 is one or two; the number of the rail 200 is the same as the number of the lifting column 300; and the rail is in one-to-one correspondence with the lifting column 300. Specifically, referring to FIGS. 1, 3 and 7, as the number of the rail 200 is one, the electric lift device is a single-rail structure. Referring to FIGS. 8-9, as the number of the rail 200 is two, the electric lift device is a double-rail structure. The working principle of the single-rail structure and the double-rail structure is the same, with the differences only in the number and arrangement of the rails and the structure connected to the rails 200.

In an embodiment, the preset angle ranges from 4-10 degrees. Specifically, the preset angle can be 5 or 6 degrees, with the best effect. If the preset angle is too small, it essentially renders no practical benefit, failing to counteract the user's forward-leaning tendency effectively. If the preset angle is too large, it also has an adverse effect, causing the user to lean back and even fall.

The double-rail structure offers better load-bearing capacity and stability compared to the single-rail structure. Specifically, the single-column structure has a lifting height of 500 mm and a load capacity of 400 LB, while the double-rail structure has a lifting height of 760 mm and a load capacity of 500 LB.

Figure 6:
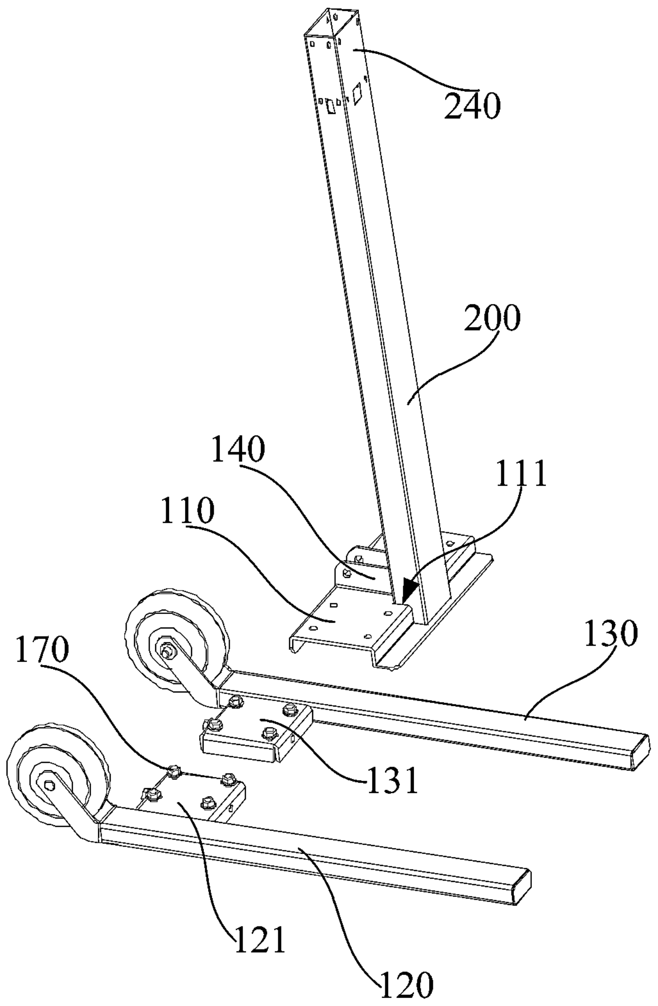
FIG. 6 is an exploded view of the matching between a support assembly and a rail.
Figure 10:
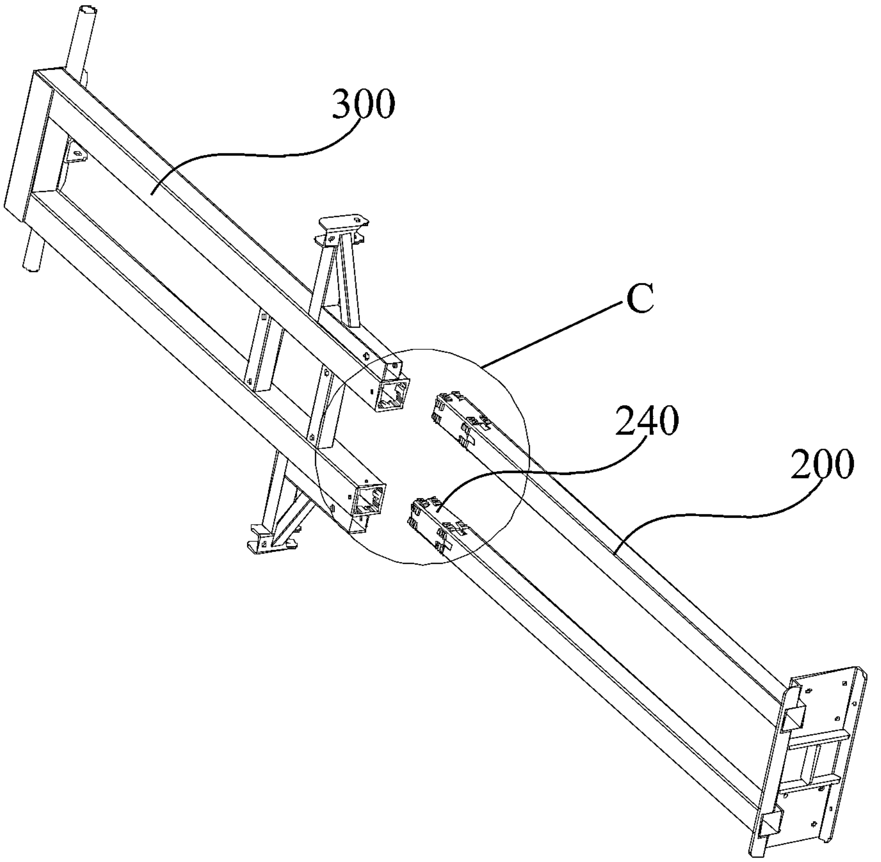
FIG. 10 is an exploded view of the rail and the lifting column of an electric lift device with a double-rail structure according to an embodiment.
Figure 12:
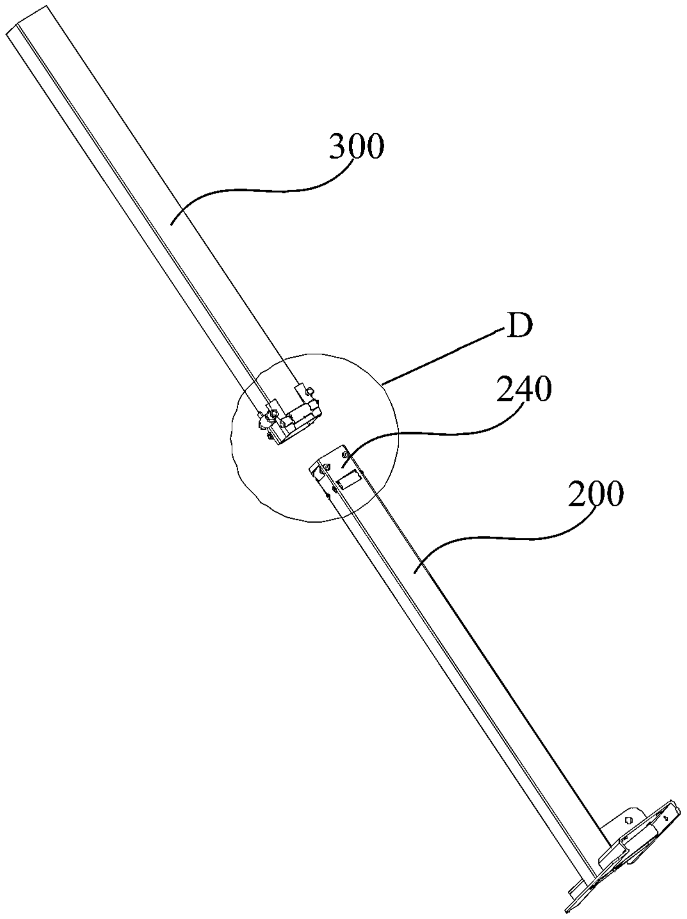
FIG. 12 is an exploded view of the rail and the lifting column of an electric lift device with a single-rail structure according to an embodiment.

Referring to the FIGS. 6, 10 and 12, the rail 200 is provided with a rail head 240. The lifting column 300 is coaxially sleeved on the rail 200 from the end of the rail where the rail head 240 is provided. The lifting column 300 covers the rail head 240.

Figure 7:
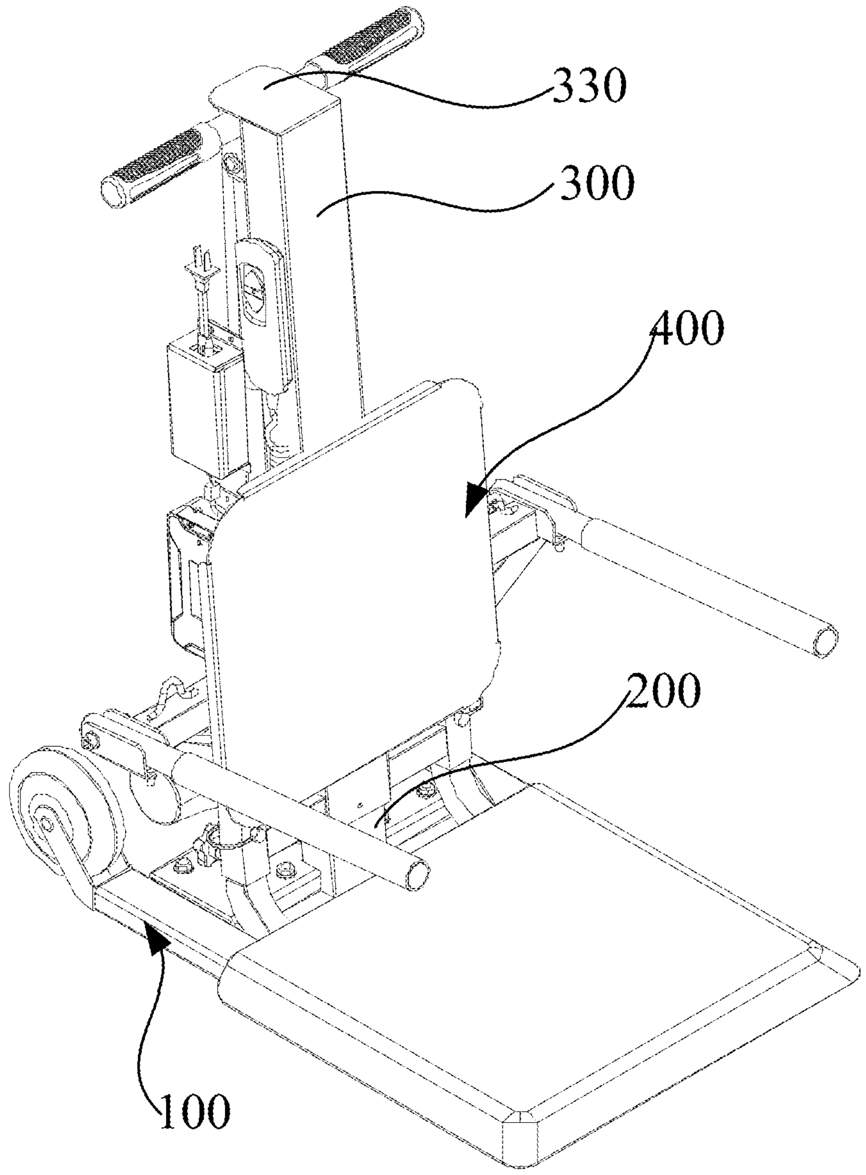
FIG. 7 schematically shows the structure of an electric lift device with a single-rail structure when its seat assembly is at the lowest position according to an embodiment.
Figure 8:
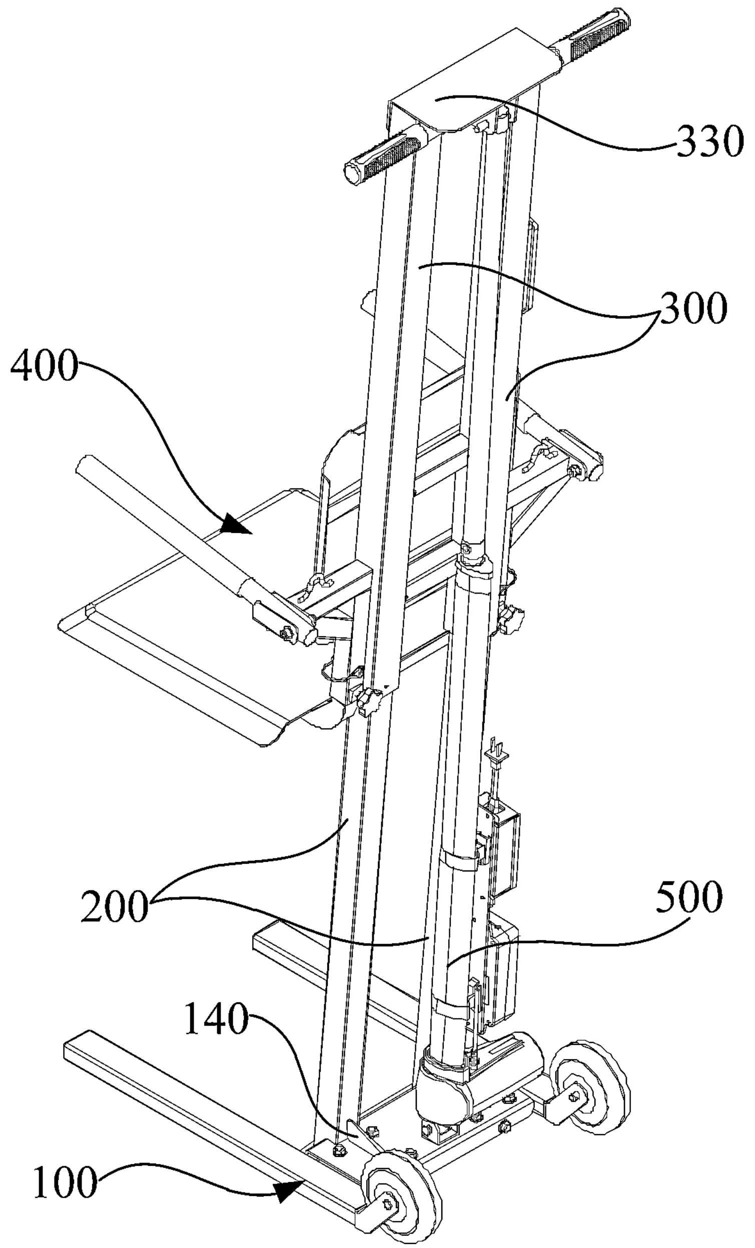
FIG. 8 is a schematic diagram of the structure of an electric lift device with a double-rail structure according to an embodiment.
Figure 9:
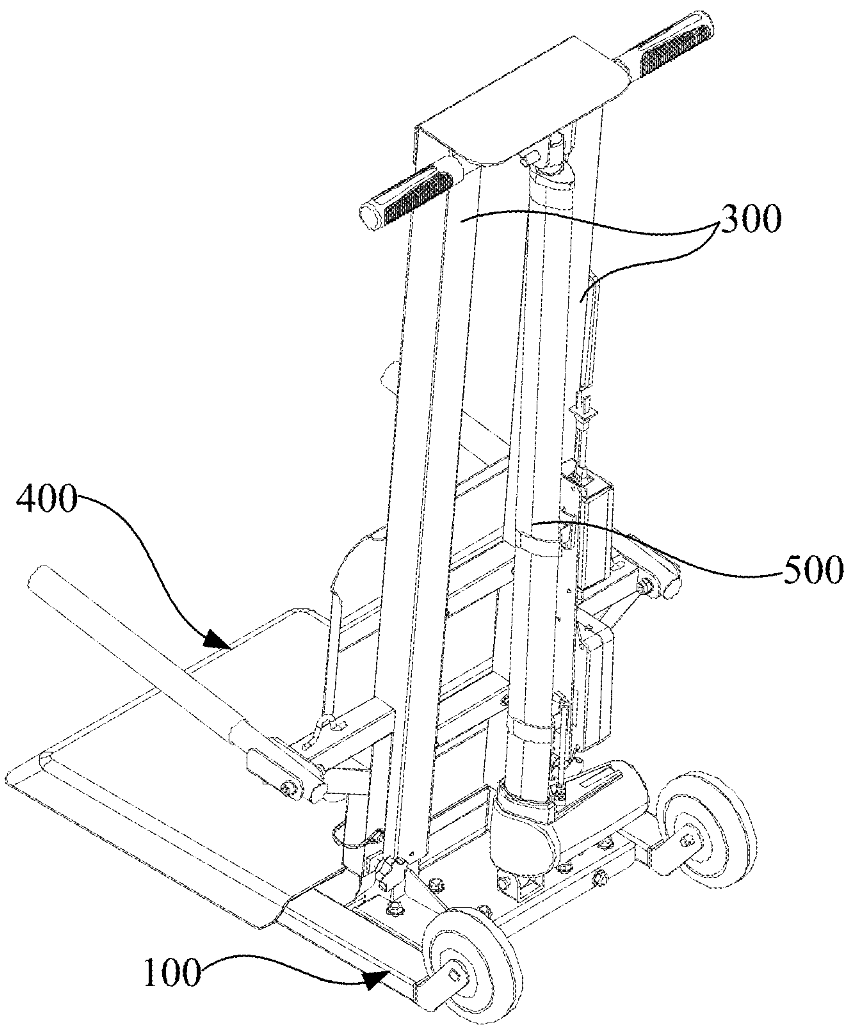
FIG. 9 schematically shows the structure of an electric lift device with a double-rail structure when its seat assembly is at the lowest position according to an embodiment.

Referring to the FIGS. 7 and 8, the lifting column 300 has an end cap 330 at the end away from the rail 200. The lifting column 300 and the end cap 330 cover the rail head 240. Specifically, the arrangement of the end cap 330 ensures that regardless of the movement of the lifting column 300, the rail head 240 cannot protrude through the end cap 330, thereby reliably covering the rail head 240.

As shown in FIGS. 1 and 8, the rail 200 is a quadrilateral-shaped pipe with a rectangular cross-section, and the lifting column 300 is also a quadrilateral-shaped member pipe with a rectangular cross-section. Specifically, the quadrilateral-shaped pipes with the rectangular cross-section offer high stability both vertically and horizontally and are commonly available in the material market. In this embodiment, the rail 200 and the lifting column 300 are both rectangular pipes in cross-section.

Figure 11:
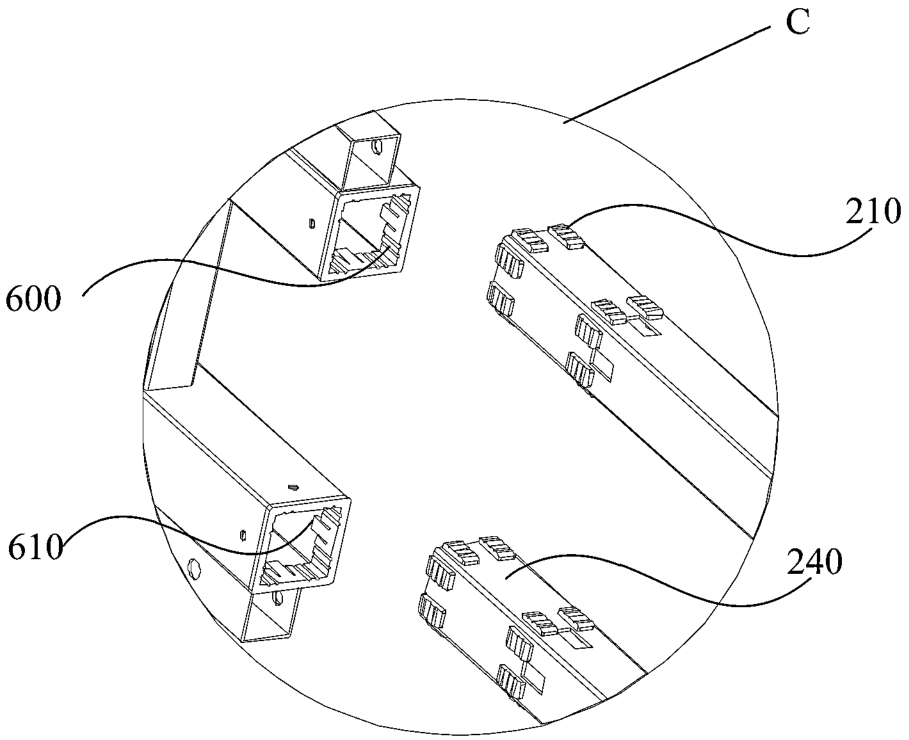
FIG. 11 is a partial enlargement view of C in FIG. 10.

Referring to FIGS. 10 and 11, a friction sleeve 600 is provided between the rail 200 and the lifting column 300. Specifically, the direct friction between the rail 200 and lifting column 300 can be prevented due to the arrangement of the friction sleeve 600, so as to prevent wear and tear on the rail 200 and/or the lifting column 300. In an embodiment, the friction sleeve 600 is fixedly arranged on the inner wall of the lifting column 300 and is slidably sleeved on the outer wall of lifting column 300, thereby allowing the rail 200 and the lifting column 300 to slide cooperatively.

As shown in FIG. 11, the friction sleeve 600 is provided with a guide protrusion 610, and the end of the rail 200 matched with the lifting column 300 is provided with a group of guide blocks 210. The group of guide blocks 210 includes two guide blocks 210 arranged at intervals. The guide protrusion 610 is fitted between the two guide blocks 210 of the group of guide blocks 210, thereby providing guidance for lifting column 300. Specifically, there are multiple guide protrusions 610. The end of the rail 200 matched with the lifting column 300 is provided with multiple groups of guide blocks 210. Each guide protrusion 610 corresponds to one group of the guide blocks 210. In the embodiment, the number of the guide protrusion 610 is four. The four guide protrusions 610 are provided at the middle of the four inner walls of the friction sleeve 600. The four guide blocks 210 are provided on the four outer walls at one end of the rail 200 matched with the lifting column 300.

In an embodiment, the friction sleeve 600 is made of POM (polyoxymethylene).

Figure 13:
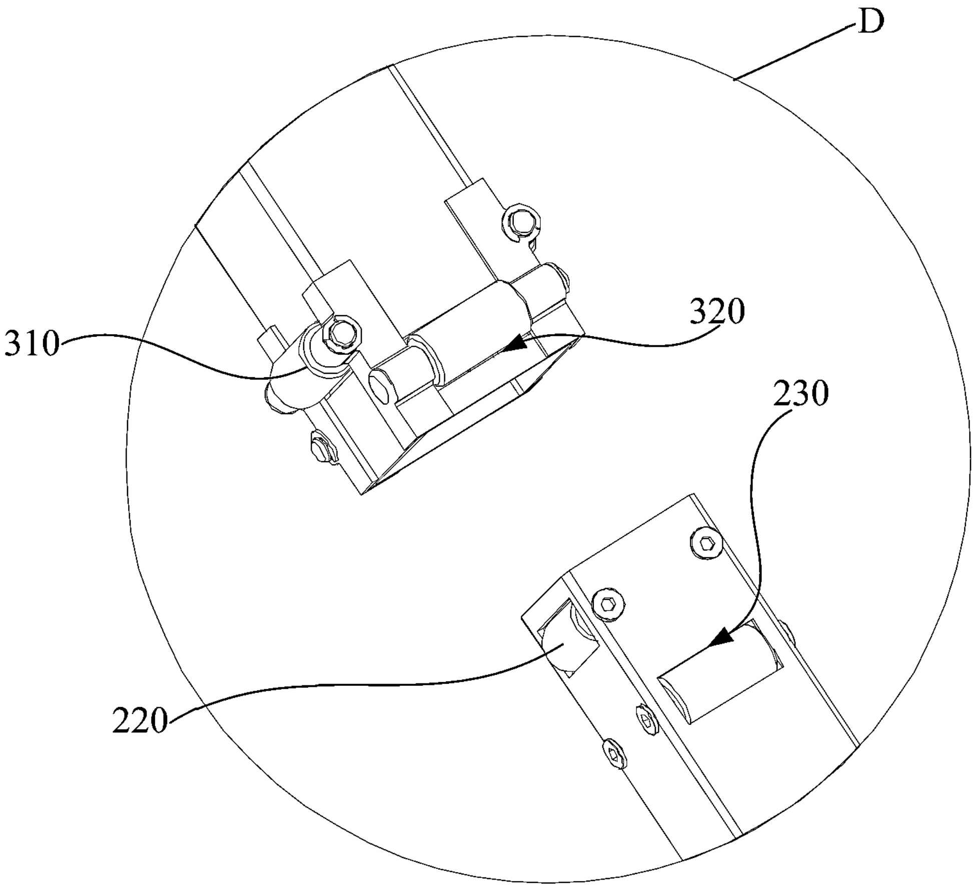
FIG. 13 is a partial enlargement view of D in FIG. 12.

Referring to FIGS. 12-13, in an embodiment, the electric lift device is not provided with a friction sleeve 600. One end of the rail 200, matched with the lifting column 300, is provided with a first guide wheel 220, while one end of the lifting column 300, matched with the rail 200, is provided with a second guide wheel 310. The first guide wheel 220 rolls cooperatively with the lifting column 300, and the second guide wheel 310 rolls cooperatively with the rail 200. Specifically, the arrangement of the first guide wheel 220 and the second guide wheel 310 serves two purposes: firstly, to prevent direct friction between the rail 200 and the lifting column 300, thereby avoiding wear and tear on the rail 200 and/or the lifting column 300, and secondly, to provide guidance for the lifting column 300.

Specifically, both the first guide wheel 220 and the second guide wheel 310 are present in multiple quantities. In this embodiment, the numbers of the first guide wheel 220 and the second guide wheel 310 are both four. Four outer walls at one end of the rail 200 matched with the lifting column 300 are provided with four first openings 230, where the four first guide wheels 220 are rotatably installed. Similarly, four outer walls at one end of the lifting column 300 matched with the rail 200 are provided with four second openings 320, where the four second guide wheels 310 are rotatably installed. This arrangement enables the first guide wheels

220 to roll cooperatively with the lifting column 300 and the second guide wheels 310 to roll cooperatively with the rail 200.

Referring to FIGS. 1 and 6, the support assembly 100 includes a support plate 110, a first rectangular tube 120, and a second rectangular tube 130. The first rectangular tube 120 and the second rectangular tube 130 are vertically provided at both ends of the support plate 110. The rail 200 is provided on the support plate 110, and the rail 200 is provided upright relative to the plane formed by the support plate 110, the first rectangular tube 120, and the second rectangular tube 130. Specifically, when the electric lift device is placed on the ground, the axes of the first rectangular tube 120 and the second rectangular tube 130 are parallel to the horizontal direction. Both the first rectangular tube 120 and the second rectangular tube 130 are rectangular tubes, which means they have top and bottom walls as well as two side walls. These side walls provide support and bear the load from the top wall. The presence of these side walls makes the support of the first rectangular tube 120 and the second rectangular tube 130 more reliable, enabling them to bear greater loads. Furthermore, compared to a whole bottom plate, the first rectangular tube 120 and the second rectangular tube 130 are lighter in weight.

Referring to FIGS. 1, 6 and 8, a reinforcement rib 140 is provided between the rail 200 and the support plate 110. Specifically, the arrangement of the reinforcement rib 140 enhances the connection strength between the rail 200 and the support plate 110. In this embodiment, the reinforcement ribs 140 are welded to the top surface of the support plate 110 and to the side surface of the rail 200.

Referring to FIG. 6, there are multiple reinforcement ribs 140 provided to further strengthen the connection between the rail 200 and the support plate 110. In this embodiment, there are two reinforcement ribs 140 arranged spaced apart.

Figure 5:
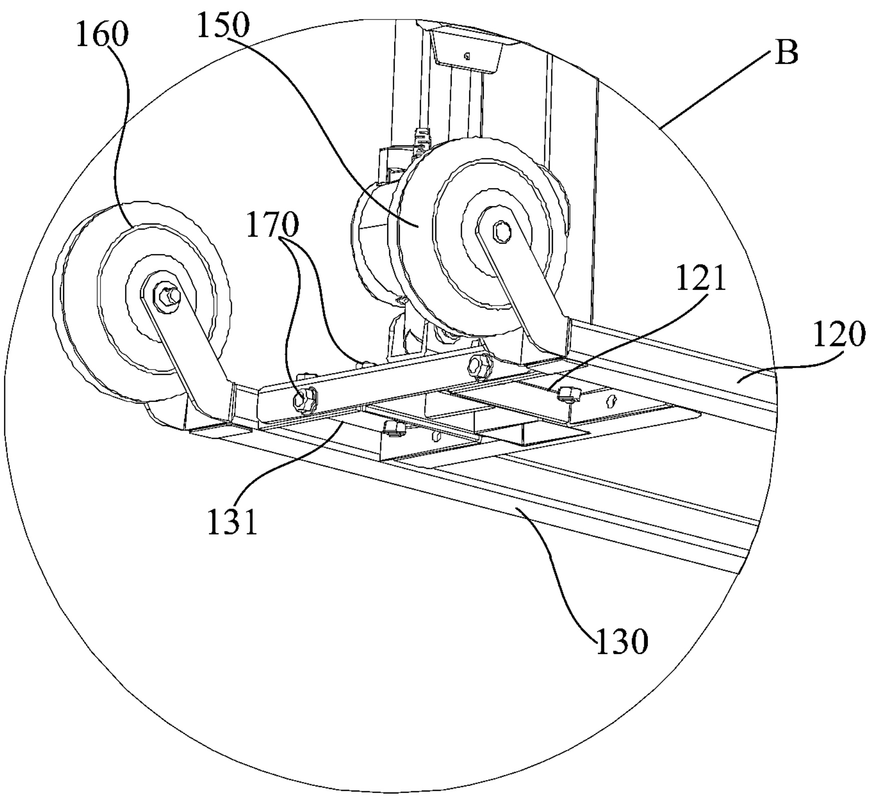
FIG. 5 is a partial enlargement view of B in FIG. 3.

Referring to FIGS. 1, 5, and 6, the support assembly 100 also includes a first wheel 150 and a second wheel 160. The first wheel 150 is rotatably mounted on the first rectangular tube 120, and the second wheel 160 is rotatably mounted on the second rectangular tube 130. Specifically, the installation of the first wheel 150 and the second wheel 160 facilitates the movement of the electric lift device.

Furthermore, the distance from the rotational axis of the first wheel 150 and the second wheel 160 to the bottom surface of the first rectangular tube 120 is greater than the radius of the first wheel 150 and the second wheel 160. Thus, when the electric lift device is placed on the ground and the bottom surfaces of the first rectangular tube 120 and the second rectangular tube 130 are in contact with the ground, the first wheel 150 and the second wheel 160 do not touch the ground. This configuration ensures that the electric lift device can be stably placed on the ground, preventing it from slipping and moving. When it is necessary to move the electric lift device, press down the electric lift device on the side close to the first wheel 150 and the second wheel 160, so as to bring the first wheel 150 and the second wheel 160 into contact with the ground. This action will lift the side of the electric lift device away from the first wheel 150 and the second wheel 160, making it easier to move the electric lift device.

The first wheel 150 is rotatably mounted on the rear side of the first rectangular tube 120, and the second wheel 160 is rotatably mounted on the rear side of the second rectangular tube 130. Specifically, with the side of the seat 420 away from the rail 200 considered as the front side of the electric lift device, and the side of the rail 200 away from the seat 420 considered as the rear side of the electric lift device. Both the first wheel 150 and the second wheel 160 are disposed on the rear side of the support assembly 100. When it is required to move or transfer the electric lift device, it is only required to press down the electric lift device on the rear side to lift the front side to make the first wheel 150 and the second wheel 160 be in contact with the ground, allowing for easy and convenient transfer.

Referring to FIGS. 5 and 6, the first rectangular tube 120 is provided with a first extension part 121 on one side facing the second rectangular tube 130, and the second rectangular tube 130 is provided with a second extension part 131 on one side facing the first rectangular tube 120. The connection between the first rectangular tube 120 and the second rectangular tube 130 with the support plate 110 is implemented through the first extension part 121 and the second extension part 131.

Referring to FIGS. 1, 5 and 6, both the first extension part 121 and the second extension part 131 are connected to the support plate 110 via screws 170, allowing the rail 200 to be detachable from the first rectangular tube 120 and the second rectangular tube 130, thereby saving transportation and packaging space. Specifically, there are multiple screws 170, ensuring a more reliable connection between the first extension part 121, the second extension part 131, and the support plate 110.

In an embodiment, multiple screws 170 pass through the top surface of the support plate 110 and extend into the first extension part 121 and the second extension part 131, thereby achieving a reliable connection between the first extension part 121, the second extension part 131, and the support plate 110. In this embodiment, there are also multiple screws 170 passing through the rear side of the support plate 110, with some of them extending into the first extension part 121 and some of them into the second extension part 131, thereby enhancing the reliability of the connection between the first extension part 121, the second extension part 131, and the support plate 110. In this arrangement, even if all the screws 170 passing through the top surface of the support plate 110 become damaged or ineffective, the support provided by the screws 170 passing through the rear side of the support plate 110 prevents the rear side of the support plate 110 from tilting, thereby avoiding the forward tilting of the seat assembly 400 and the user sitting thereon.

Referring to FIGS. 1 and 6, the support plate 110 has a Z-shape structure and is provided with a notch 111. The rail 200 is positioned at the notch 111 of the support plate 110 and is connected to the Z-shaped support plate 110. Specifically, configuring the support plate 110 in a Z-shape allows not only the bottom surface of the rail 200 to be in contact and connected to the top surfaces of the support plate 110 but also enables the side of the rail 200 to be in contact and connected to the side walls connected the two top surface of the Z-shaped support plate 110 at the notch 111, thereby increasing the contact area between the rail 200 and the support plate 110 and enhancing the stability and reliability of the connection between them.

In an embodiment, the rail 200 is connected to the support plate 110 by welding.

Referring to FIG. 1, the seat assembly 400 includes a connecting frame 410, a seat 420, and two armrests 430. The connecting frame 410 is fixedly connected to the lifting column 300, the seat 420 is connected to the connecting frame 410, and the two armrests 430 are connected to the opposite two sides of the connecting frame 410. Specifically, the placement of the two armrests 430 allows the user to grip them with both hands while sitting on the seat 420, providing increased stability. Moreover, after being raised to the desired height, the user can place both hands on the armrests 430 to facilitate standing up. In this embodiment, the connecting frame 410 and the lifting column 300 are combined as a whole by welding.

Referring to FIG. 1, the seat assembly 400 also includes a backrest 440, which is provided at the connecting frame 410. The backrest 440 forms a certain angle with the seat 420, allowing the user to lean back against the backrest 440 for increased safety and comfort. In one embodiment, the backrest 440 forms a 90 degrees angle with the seat 420.

The armrests 430 are hingedly connected to the connecting frame 410, allowing them to rotate relative to the connecting frame 410 and be folded. Specifically, when the user needs to sit on the seat 420, they can flip up the armrests 430. This enables the user to sit on the seat 420 not only from the front but also from the sides. When the user sits on the seat 420 from the front, it prevents them from bumping into the armrests 430, thereby enhancing the convenience of sitting on the seat 420.

Specifically, the armrests 430 are in a horizontal position during use. When flipped up, the armrests 430 are in a vertical position.

Figure 4:
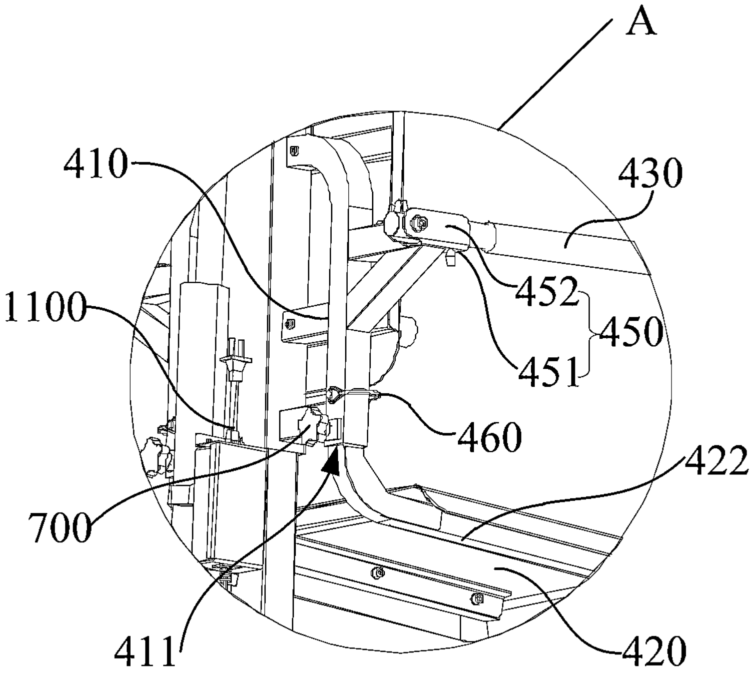
FIG. 4 is a partial enlargement view of A in FIG. 3.

Referring to FIGS. 1, 3 and 4, the seat assembly 400 also includes a limiting structure 450, which is designed to restrict the rotation angle of the armrests 430, preventing any unintended movement that may cause the user to fall. Specifically, the limiting structure 450 is configured to provide upward support to the armrests 430 when the armrests 430 are in the horizontal position, preventing the armrests 430 from rotating further downward.

Referring to FIGS. 1 and 4, the limiting structure 450 includes a bottom plate 451 and two side plates 452 at intervals on the bottom plate 451. The bottom plate 451 and the two side plates 452 together enclose a semi-enclosed space. When the armrest 430 rotates downward into the semi-enclosed space, the bottom plate 451 provides upward support to the armrest 430, preventing it from further downward rotation. This ensures that the armrest 430 can provide reliable support to the user.

As shown in FIG. 1, the seat 420 is provided with a downward-sloping ramp portion 421, thereby forming a ramp. When the seat 420 is at a lower position, it becomes easier for the occupant (or person) to move from the floor onto the seat 420.

In an embodiment, the ramp portion 421 is provided on the side of the seat 420 away from the rail 200.

In an embodiment, the ramp portion 421 is provided on lateral side of the seat 420, either to the left or right side.

In an embodiment, the left and right sides of the seat 420 both have ramp portions 421 that extend in a direction toward a floor.

In an embodiment, the seat 420 is provided with ramp portions 421 on the side away from the rail 200 and one side of the left and right sides of the seat 420. The ramp portions 421 slope downwards.

Referring to FIG. 1, in the embodiment, the seat 420 is provided with ramp portions 421 sloping downwards on the side of the seat 420 away from the rail 200, as well as on both the left and right sides of the seat 420, forming a ramp. In this embodiment, the seat 420 is square with front, rear, left, and right sides. The side of the seat 420 away from the rail 200 is considered the front side, the side of the seat 420 near the rail 200 is the rear side, and the remaining two sides of the seat 420 are the left and right sides. The front side and the left and right sides of the seat 420 are all provided ramp portions 421 sloping downwards, creating a ramp that facilitates user movement onto the seat 420. This ramp also acts as a bevel, preventing users from being scratched from the front or the left and right sides of seat 420 when sitting on the front or the left and right sides of the seat 420.

In an embodiment, when the seat 420 is lowered to its lowest height, the distance between the seat 420 and the ground is 40 mm. With the downward-sloping ramp portion 421, users can easily move from the ground to the seat 420.

The seat 420 is removably connected to the connecting frame 410. Specifically, this arrangement allows for easier transportation and packaging of the electric lift device. When transportation or packaging of the electric lift device is required, the seat 420 can be removable from the connecting frame 410, the armrests 430 can be flipped up, and the lifting column 300 and the seat assembly 400 can be lowered to their lowest height, thereby reducing the space occupied by the electric lift device.

As shown in FIGS. 1, 3 and 4, the bottom of the seat 420 is provided with connecting rod 422, while the connecting frame 410 is provided with connecting slot 411. The connecting rod 422 extends into the connecting slot 411, thereby enabling the seat 420 to be removably connected to the connecting frame 410. Specifically, the removable connection between the connecting rod 422 and the connecting frame 410 is facilitated by D-shaped pin 460.

As shown in FIGS. 1, 3 and 4, the number of connecting rods 422 can be multiple, and all connecting rods 422 are removably connected to the connecting frame 410, thereby making the connection between the seat 420 and the connecting frame 410 more reliable. The number of connecting slots 411 and D-shaped pins 460 corresponds to the number of connecting rods 422, and each one matches with one connecting rod 422. In this embodiment, the number of connecting rods 422 is two.

Referring to FIG. 4, the electric lift device also includes a locking part 700, which is configured to lock the seat 420 relative to the connecting frame 410. Specifically, the connecting rods 422 extend into the connecting slots 411 to achieve a removable connection between the seat 420 and the connecting frame 410. The seat 420 may sway relative to the connecting frame 410, affecting the user's experience. The locking part 700 is set up to prevent the seat 420 from swaying relative to the connecting frame 410.

The locking part 700 is a locking screw that passes through connecting frame 410 and presses against connecting rod 422, thereby locking seat 420 relative to connecting frame 410.

As shown in FIG. 1, the electric lift device also includes a controller 800, which is electrically connected to the driving component 500. The controller 800 is configured to control the start and stop of the driving component 500. The user can control the start and stop of the driving component 500 through the controller 800, thereby controlling the lifting and lowering of the lifting column 300 and the seat assembly 400, allowing the user to easily control the lifting process. In this embodiment, the controller 800 is provided at the lifting column 300. Even when the lifting column 300 is ascended or descended, the distance between the controller 800 and the user sitting on the seat 420 remains constant. This allows users to easily control the controller 800 during the lifting process.

Figure 14:
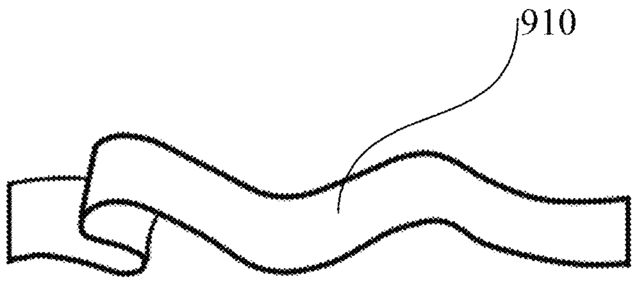
FIG. 14 is a schematic diagram of the structure of a safety belt according to an embodiment.

As shown in FIGS. 1 and 14, the electric lift device also includes two safety hooks 900, which are positioned on the opposite two sides of the seat assembly 400. These safety hooks 900 are configured to secure safety belts 910. Specifically, after the user sits on the seat 420, they can fasten the safety belts 910 using the safety hooks 900, significantly enhancing the user's safety. In this embodiment, the safety hooks 900 are positioned on the opposite two sides of the connecting frame 410, adjacent to the two armrests 430 respectively. Additionally, present safety belts such as those used in cars can be adopted.

Referring to FIG. 1, the electric lift device also includes a storage battery 1000, which is electrically connected to the driving component 500. The storage battery 1000 is configured to supply power to the driving component 500.

Referring to FIG. 4, the electric lift device also includes a charger, and the charger is configured to charge the storage battery 1000.

Referring to FIG. 1, the electric lift device also includes a handle 1200, which is fixedly positioned at the top of the lifting column 300. The handle 1200 can follow the lifting column 300 to ascend and descend relative to the rail 200. When the driving component 500 drives the lifting column 300 to ascend and descend relative to the rail 200, the handle 1200 synchronously ascends and descends with the lifting column 300, allowing for adjustable height of the handle 1200.

Specifically, the handle 1200 can be configured to push the electric lift device for transfer or for rehabilitation training. In this embodiment, the seat assembly 400 is positioned on the front side of the lifting column 300, while the handle 1200 is disposed on the rear side of the lifting column 300. Additionally, the first rectangular tube 120 and the second rectangular tube 130 extend from the rear side of the electric lift device to the front side, with some parts extending to positions that the front side of the rail 200 faces. This configuration allows some sections of the first rectangular tube 120 and the second rectangular tube 130 to be positioned below the seat assembly 400, further preventing forward tilting when the user sits on the seat assembly 400. Moreover, when the seat assembly 400 descends to its lowest position, the first rectangular tube 120 and the second rectangular tube 130 also provide support for the seat assembly 400.

The first wheel 150 is rotatably disposed on the rear side of the first rectangular tube 120, and the second wheel 160 is rotatably disposed on the rear side of the second rectangular tube 130. This means that the first wheel 150 and the second wheel 160 are disposed on the side of the rail 200 away from the seat assembly 400. The first wheel 150 and the second wheel 160 are positioned on different sides of the rail 200 from the seat assembly 400. Therefore, when it is necessary to transfer the electric lift device, pressing down on the electric lift device from the rear side causes the front side of the electric lift device to lift. At this point, the first wheel 150 and the second wheel 160 are in contact with the ground, facilitating the transfer of the electric lift device. Additionally, when pressing down on the electric lift device from the rear side, the seat assembly 400, the first rectangular tube 120, and the second rectangular tube 130 do not obstruct or interfere.

Referring to FIG. 1, there are two handles 1200, positioned symmetrically to facilitate the user to grip with both hands. Specifically, the outer perimeter of the handles 1200 is provided with an anti-slip texture.

The above are only exemplary embodiments of the present disclosure and are not intended to limit the scope of the present disclosure. Any equivalent transformations of devices or applications in other related technical fields made under the conceptualization of the present disclosure, utilizing the description and drawings of the present disclosure, shall fall the scope of the patent protection of the present disclosure.

What is claimed is:

1. An electric lift device, comprising:

a support assembly;

a rail;

a lifting column;

a seat assembly; and a driving component;

wherein the rail is provided on the support assembly;

the lifting column is coaxially sleeved on the rail;

the lifting column is configured to ascend and descend along an axis of the rail;

the seat assembly is connected to the lifting column;

the driving component is provided at the support assembly;

the driving component is configured to drive the lifting column to ascend and descend relative to the rail, so as to drive the seat assembly to ascend and descend;

the rail is inclined at a preset angle relative to the support assembly towards a side of the rail away from the seat assembly;

the support assembly comprises a support plate; the rail is arranged on the support plate; the support plate has a Z-shaped structure; the support plate is provided with a notch; and a bottom end of the rail is inserted into the notch, and is connected to the support plate;

a reinforcement rib is provided between the rail and the support plate; a first side of the reinforcement rib is weldedly connected to a top surface of the support plate; and a second side of the reinforcement rib is weldedly connected to a side surface of the rail.

2. The electric lift device of claim 1, wherein a number of the rail is one or two;

the number of the rail is the same as a number of the lifting column; and the rail is in one-to-one correspondence with the lifting column.

3. The electric lift device of claim 1, wherein the preset angle is 4-10°.

4. The electric lift device of claim 1, wherein the rail is provided with a rail head;

the lifting column is coaxially sleeved on the rail from an end of the rail where the rail head is provided; and the lifting column is configured to cover the rail head.

5. The electric lift device of claim 1, wherein the support assembly further comprises a first rectangular tube and a second rectangular tube; and the first rectangular tube and the second rectangular tube are provided on opposite two sides of the support plate, respectively.

6. The electric lift device of claim 5, wherein the support assembly further comprises a first wheel and a second wheel; the first wheel is rotatably provided at the first rectangular tube; and the second wheel is rotatably provided at the second rectangular tube.

7. The electric lift device of claim 6, wherein a distance from a rotational axis of the first wheel to a bottom surface of the first rectangular tube is greater than a radius of the first wheel; and a distance from a rotational axis of the second wheel to a bottom surface of the second rectangular tube is greater than a radius of the second wheel.

8. The electric lift device of claim 5, wherein a side of the first rectangular tube facing the second rectangular tube is provided with a first extension part, and a side of the second rectangular tube facing the first rectangular tube is provided with a second extension part; and the first extension part and the second extension part are screwedly connected to the support plate.

9. The electric lift device of claim 1, wherein the seat assembly comprises a connecting frame, a seat, and two armrests;

the connecting frame is fixedly connected to the lifting column, the seat is connected to the connecting frame; and the two armrests are connected to opposite two sides of the connecting frame, respectively.

10. The electric lift device of claim 9, wherein the two armrests are hingedly connected to the connecting frame to allow the two armrests to rotate relative to the connecting frame to be folded;

a side of the seat away from the rail is provided with a first ramp portion, and two lateral sides of the seat are each provided with a second ramp portion; and the first ramp portion is configured to extend in a direction toward a floor, and the second ramp portion is configured to extend in the direction toward the floor; and/or the seat is removably connected to the connecting frame.

11. The electric lift device of claim 1, further comprising:

a controller;

two hooks;

a storage battery; and a handle;

wherein the controller is electrically connected to the driving component, and is configured to control start and stop of the driving component;

the two hooks are provided on opposite two sides of the seat assembly, and are configured for mounting a safety belt;

the storage battery is electrically connected to the driving component, and configured to power the driving component; and the handle is fixedly provided at a top of the lifting column, and is configured to ascend and descend with the lifting column relative to the rail.

12. The electric lift device of claim 1, wherein the support plate comprises the top surface, a first side surface, a second side surface and an extension portion; the first side surface is configured to extend downward from a first side of the top surface, and the second side surface is configured to extend downward from a second side of the top surface; the notch is formed at the top surface and the second side surface; the extension portion is configured to extend horizontally from a lower edge of the second side surface in a direction away from the first side surface; and the bottom end of the rail is welded to the top surface, the second side surface and the extension portion.

13. The electric lift device of claim 1, wherein a friction sleeve is provided between the rail and the lifting column; the friction sleeve is provided with a guide protrusion; an end of the rail matched with the lifting column is provided with a guide block group; the guide block group comprises two guide blocks arranged at intervals; and the guide protrusion is configured to be fitted between the two guide blocks.

14. The electric lift device of claim 1, wherein an end of the rail matched with the lifting column is provided with a first guide wheel; an end of the lifting column matched with the rail is provided with a second guide wheel; the first guide wheel is in rolling fit with the lifting column; and the second guide wheel is in rolling fit with the rail.

* * * * *